Dec. 22, 1925.

T. R. G. PARKER 1,566,557

TRIMMING MECHANISM FOR CURVED STEREOTYPE PLATE CASTING MACHINES

Filed Jan. 26, 1924

Inventor.
Thomas R. G. Parker
By Rogers, Kennedy & Campbell
Attorneys

Patented Dec. 22, 1925.

1,566,557

UNITED STATES PATENT OFFICE.

THOMAS ROBERT GILLETT PARKER, OF ALTRINCHAM, ENGLAND, ASSIGNOR TO LINOTYPE AND MACHINERY LIMITED, OF LONDON, ENGLAND, A COMPANY REGISTERED UNDER THE LIMITED LIABILITY COMPANY'S ACTS (1862 TO 1900) OF THE BRITISH IMPERIAL PARLIAMENT.

TRIMMING MECHANISM FOR CURVED-STEREOTYPE-PLATE-CASTING MACHINES.

Application filed January 26, 1924. Serial No. 688,640.

*To all whom it may concern:*

Be it known that I, THOMAS ROBERT GILLETT PARKER, a British subject, and resident of Altrincham, in the county of Chester, England, have invented new and useful Improvements in or Relating to Trimming Mechanism for Curved-Stereotype-Plate-Casting Machines, of which the following is a specification.

This invention relates to trimming mechanism for curved stereotype plate casting machines and more particularly to the saw employed in such mechanism for severing from the plate the sullage-piece or head produced thereon by the casting operation. The invention has for its object to provide means for adjusting the saw for different sizes of plates, more conveniently and expeditiously than has heretofore been possible with the means hitherto available for the purpose.

Heretofore adjustments of the character contemplated by the present invention, have involved the substitution or interchange of distance pieces of different lengths, by which the revolving saw is held in its different positions according to the width of the plates to be produced. Such a substitution or interchange of these distance pieces necessarily absorbs a considerable amount of time not only in that operation itself, but by reason of the difficulty of obtaining access to the saw.

According to the present invention, the foregoing difficulties are overcome by providing a construction whereby the saw can be adjusted by a screw rotatable from the outside of the casing in which the saw is located, and the saw can be retained in its different operative positions by a register pin insertable also from the outside of said casing, and whereby, still from the outside, the position of the saw can be determined and readily ascertained.

In the accompanying drawings which represent one constructional form of the improved mechanism:—

Figure 1:
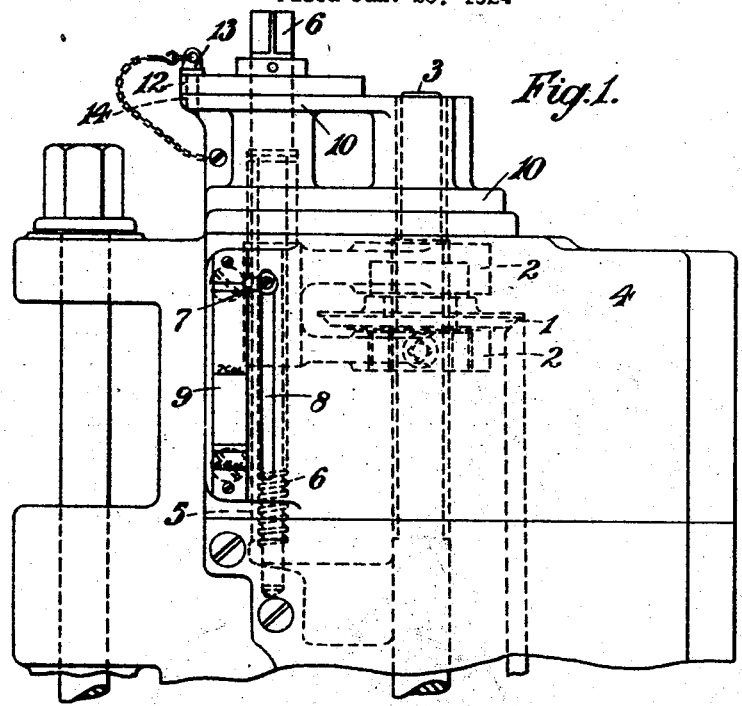
Figure 2:
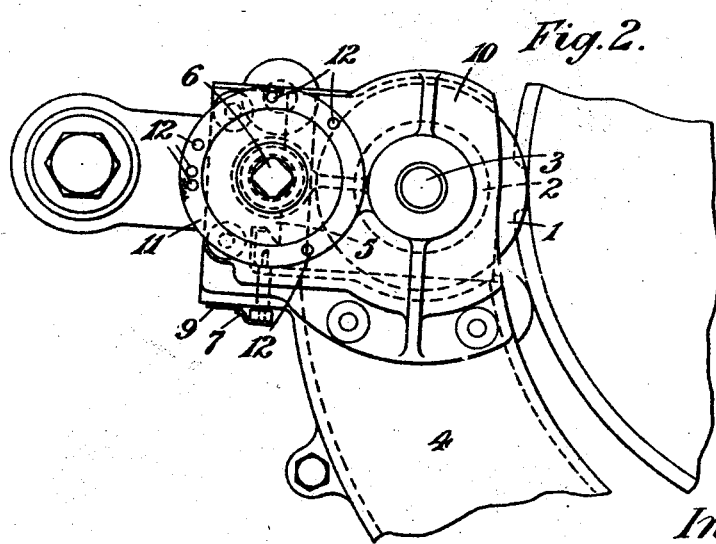

Figure 1 is an elevation of sufficient of the trimming mechanism to illustrate the embodiment therein of the present improvements, and Figure 2 is a plan of same.

In the construction as here illustrated, the saw 1 is mounted between the two tines or arms of a fork or yoke 2, with a capacity for rotary movement relatively to said arms, but not otherwise movable independently thereof, said saw, as ordinarily, being splined to its shaft 3 so that it can be shifted along that shaft without disturbing its rotative connection therewith.

The yoke 2 is itself capable of being adjusted within the saw casing 4, in a direction parallel with the axis of the shaft 3, the said yoke, for this purpose, being constrained to move in that direction by a guide 5 fixed to, or formed integral with, the saw casing. The movement of the yoke 2 along the guide 5 is imparted to it by a vertical screw shaft 6 journalled in the saw casing 4, and in threaded engagement with the yoke, and the upper end of this screw shaft projects through the saw casing and, at that part, is of square form as in the drawings, or of other shape suitable for receiving, and the engagement therewith of, a crank handle to enable the said shaft to be conveniently rotated for effecting the vertical adjustment of the saw 1 along its shaft 3.

The yoke 2 has attached to it a pointer 7 which projects through a vertical slot 8 in the saw casing 4, and this pointer, conjointly with a suitably marked scale 9 on the outside of the saw casing, serves to indicate when the saw is in proper position for cutting or trimming the stereotype plates to the desired width.

The locking of the yoke 2 in its different definite positions corresponding to those indicated on the scale 9, may be effected in various ways, but it is preferred to attain that result by the following means. On the upper end of the screw shaft 6, and closely adjacent to the cover 10 of the saw casing 4, there is rigidly secured a disc 11 having perforations 12 located in different angular positions to accord with the respectively different positions indicated on the scale 9, each such perforation being adapted to receive a registering pin 13 when that perforation is brought into co-axial register with a hole 14 (Figure 1) in the cover 10. Each of the perforations 12 may be marked correspondingly with the markings of the scale 9 so as to ensure that before the pin 13 can be inserted into the hole 14 for locking the saw 1 in a position appropriate to a given width of plate, the screw shaft 6 shall have been rotated the desired number of times and to the required extent to bring the saw into that particular position. For example, assuming that the saw is to be set for trimming a plate of say seven columns wide, the screw shaft 6 is rotated until the pointer 7 registers with the 7-column indication on the scale 9 and the 7-column perforation 12 of the disc 11 co-axially registers with the hole 14 at which juncture the pin 13 may be inserted to lock the saw 1 in the position thus precisely arrived at.

If desired, the scale 9 and disc 11 may be marked with indications of the numbers of columns or with the titles of different newspapers or journals the plates for which are of respectively different widths.

Having described my invention, I declare that what I claim and desire to secure by Letters Patent is:—

1. In plate-trimming mechanism of stereotype plate casting machines, the combination with a saw casing a saw shaft revoluble within said casing and a circular saw axially adjustable along that shaft for trimming plates of different widths, of a yoke movable in a direction parallel to the axis of the saw shaft and between the arms of which the saw is mounted, a screw shaft journalled in and rotatable from the exterior of the casing in threaded engagement with the yoke, a scale on the outside of the casing bearing indications of different operative positions of the saw, and a pointer attached to the yoke and projecting against said scale through a slot in the casing.

2. In plate-trimming mechanism of stereotype plate casting machines, the combination with a saw casing a saw shaft revoluble within said casing and a circular saw axially adjustable along that shaft for trimming plates of different widths, of a yoke movable in a direction parallel to the axis of the saw shaft and between the arms of which the saw is mounted, a screw shaft journalled in and rotatable from the exterior of the casing in threaded engagement with the yoke, a perforated disc secured to the screw shaft closely adjacent to the exterior of the casing, and a registering pin adapted to engage a disc perforation and a perforation in the casing co-axial therewith to lock the disc against angular movement.

3. In plate-trimming mechanism of stereotype plate casting machines, the combination with a saw casing a saw shaft revoluble within said casing and a circular saw axially adjustable along that shaft for trimming plates of different widths, of a yoke movable in a direction parallel to the axis of the saw shaft and between the arms of which the saw is mounted, a screw shaft journalled in and rotatable from the exterior of the casing in threaded engagement with the yoke, a scale on the outside of the casing bearing indications of different operative positions of the saw, a pointer attached to the yoke and projecting against said scale through a slot in the casing, a disc secured to the screw shaft closely adjacent to the exterior of the casing having perforations appropriate to respective operative positions of the saw and bearing indications similar to those on the scale, and a registering pin adapted to engage a disc perforation and a perforation in the casing co-axial therewith to lock the disc against angular movement.

In testimony whereof I have affixed my signature hereto.

THOMAS ROBERT GILLETT PARKER.